United States Patent
Johnson et al.

(10) Patent No.: US 6,542,089 B1
(45) Date of Patent: Apr. 1, 2003

(54) REAR MOUNTED INTEGRATED ROTARY ENCODER

(75) Inventors: David B. Johnson, South Ogden, UT (US); Joseph Haines, Ogden, UT (US); Jay Calkin, Ogden, UT (US); Scott L. Harris, Chula Vista, CA (US); Wayne W. Munroe, Lake Oswego, OR (US); Brian G. Russell, Tigard, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/957,371

(22) Filed: Sep. 21, 2001

(51) Int. Cl.$^7$ .................................................. H03M 1/22
(52) U.S. Cl. ......................................................... 341/16
(58) Field of Search .................... 341/13, 16; 29/564.1, 29/843; 73/504.16; 340/870.28, 870.31, 815.62; 600/463; 361/682; 439/13

(56) References Cited

U.S. PATENT DOCUMENTS

| | | | |
|---|---|---|---|
| 3,875,636 A | * | 4/1975 | Shultz et al. ................. 29/843 |
| 4,377,026 A | * | 3/1983 | Whitley ..................... 29/564.1 |
| 4,518,962 A | * | 5/1985 | Imose et al. ........... 340/870.28 |
| 4,727,356 A | * | 2/1988 | Abe et al. ..................... 341/13 |

FOREIGN PATENT DOCUMENTS

GB  2077057  * 12/1981

* cited by examiner

*Primary Examiner*—Patrick Wamsley
(74) *Attorney, Agent, or Firm*—Thomas F. Lenihan

(57) ABSTRACT

A rear-mount integrated rotary encoder comprises a mechanical portion and a printed circuit board portion. The mechanical portion of a rear mount integrated rotary encoder comprises a housing including a bushing for receiving one end of a rotatable. The rotatable shaft passes through an open front portion of the housing and is mechanically connected to exposed rotatable circuit contacting members. The printed circuit board portion has an encoder contact pattern formed thereon. The printed circuit board has an area larger than the cross sectional area of the housing. The encoder contact pattern surrounds an aperture in the circuit board. The rotatable shaft of the rotary encoder is passed through the aperture such that the rotatable circuit contacting members contact the encoder contact pattern on the circuit board. The housing includes projections, substantially orthogonal to the circuit board, for engaging a feature of the circuit board for securing the integrated encoder in an assembled state. Alternatively, the housing may glued to the circuit board. A further feature of the subject rear-mount integrated rotary encoder is that it is substantially cylindrical in shape to reduce the required spacing between adjacent encoders.

17 Claims, 3 Drawing Sheets

REAR MOUNTED INTEGRATED ROTARY ENCODER

FIELD OF THE INVENTION

The subject invention concerns the field of rotary encoder switch arrangements in general, and concerns integrated rotary encoders in particular.

BACKGROUND OF THE INVENTION

Many modern electronic instruments utilize discrete rotary encoders to provide front panel control to a user of the various features of the instrument. These discrete rotary encoders may be mounted directly to the rear surface of the front panel, or may be mounted on a printed circuit board (PCB) that is behind, and parallel to, the front panel of the instrument. Such rotary encoders are well known in the art, as evidenced by the wide variety of styles, such as the ECW series manufactured by Bourns, Inc. of Riverside, Calif.

The TDS-7000 series oscilloscopes, manufactured by Tektronix, Inc., Beaverton, Oreg., uses 15 rear-mount rotary encoders on its front panel circuit board. Each of the encoders is mounted to the rear side of the circuit board, such that the actuation shaft passes through the circuit board, and ultimately through a hole in the front panel. While these rotary encoders perform well, it has been found that securing each encoder to the printed circuit board is a labor-intensive time consuming hand operation that entails placing a nut onto a threaded portion of the shaft, tightening it to a specified torque, and hand soldering three electrical leads.

It has also been noted that while each rotary encoder falls within a specified range for operating torque, the variation in torque from encoder to encoder forms a distribution across the range. This variation is largely caused by the fact that discrete rotary encoders are produced at different times by different operators using different machine setups. The encoders are then placed "on the shelf" where they are intermixed during the normal sale and supply procedure. Thus, when multiple discrete rotary encoders are used on one PCB, a relatively high torque encoder may happen to be placed adjacent to a relatively low torque encoder. In such a condition, the difference in torque between the two encoders is readily noticeable to a user.

A solution to the variation in torque is to use an integrated rotary encoder, such used in model number 3777S-TEK-010 manufactured by Bourns, Inc., and used in the Tektronix 3000-series oscilloscopes. Such integrated rotary encoders employ a surface mounted encoder module, having an open rear side with exposed electrical contacts that contact printed circuit traces formed on the customer's printed circuit board (PCB). There are several advantages to this approach. First, the integrated encoders are all assembled at the same time, by the same operator, in the same process. Thus, the unit to unit variation in torque is greatly reduced. Second, in this approach, the integrated encoder manufacturer can provide full service to the customer by fabricating the PCB for the customer, mounting the integrated encoders, and testing the assembly for the customer.

Unfortunately, there are some drawbacks to the use of the above-described integrated encoder. The above-described integrated encoder may have too great a depth in certain applications where it is necessary to place its circuit board in close proximity to a front panel. Also, for applications in which the circuit board is densely populated, a rotary encoder having a large "footprint", is not a practical solution because a plurality of them will require too much board area.

What is needed is a rotary encoder arrangement for use on circuit board mounted in close proximity to a front panel, which exhibits minimal unit to unit variation in torque, and avoids the labor-intensive hand mounting operations described above.

SUMMARY OF THE INVENTION

A rear-mount integrated rotary encoder comprises a mechanical portion and a printed circuit board portion. The mechanical portion of a rear mount integrated rotary encoder comprises a housing including a bushing for receiving one end of a rotatable. The rotatable shaft passes through an open front portion of the housing and is mechanically connected to exposed rotatable circuit contacting members. The printed circuit board portion has an encoder contact pattern formed thereon. The printed circuit board has an area larger than the cross sectional area of the housing. The encoder contact pattern surrounds (or is at least concentric with respect to) an aperture in the circuit board. The rotatable shaft of the rotary encoder is passed through the aperture such that the rotatable circuit contacting members contact the encoder contact pattern on the circuit board. In one embodiment, the housing includes projections, substantially orthogonal to the circuit board, for engaging a feature of the circuit board for securing the integrated encoder in an assembled state. In another embodiment of the invention, the housing is attached to the circuit board by means of an adhesive applied to the front surface of the housing. A further feature of the subject rear-mount integrated rotary encoder is that it is substantially cylindrical in shape to reduce the required spacing between adjacent encoders.

DETAILED DESCRIPTION OF THE DRAWING

Figures 1, 2:
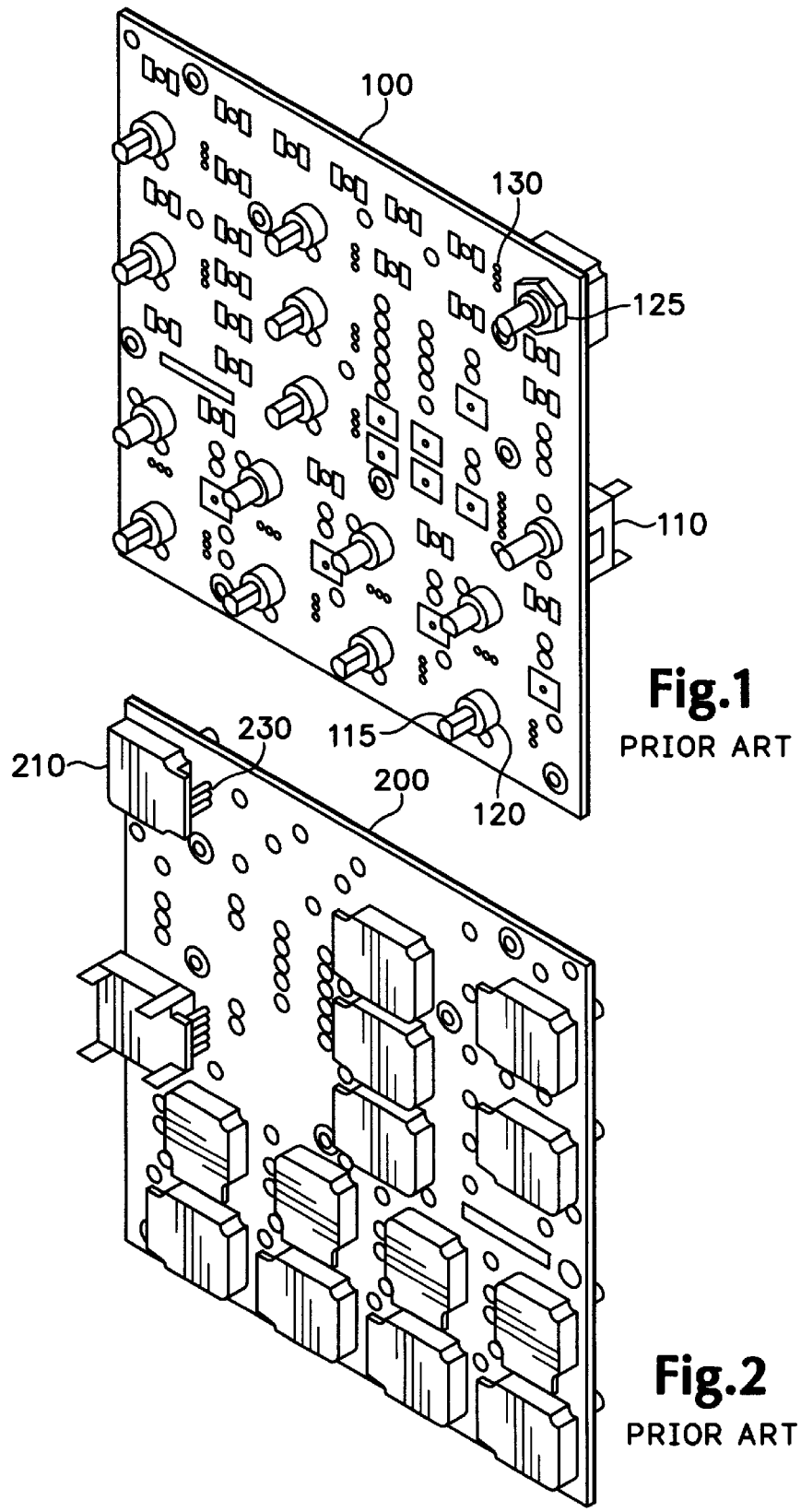
FIG. 1 shows a front view of a circuit board having mounted thereon multiple discrete rotary encoders, as known from the prior art.
FIG. 2 shows a rear view of a circuit board of FIG. 1 having mounted thereon multiple discrete rotary encoders, as known from the prior art.

Referring to FIG. 1, a printed circuit board (PCB) 100 has multiple rear-mount discrete rotary encoders 110 mounted thereon. Rotary encoders 110 include an actuation shaft 115 that is disposed, and rotates, within a cylindrical threaded bushing 120. During assembly, shaft 115 and cylindrical threaded bushing 120 are passed through an aperture in PCB 100. A nut 125 is threaded onto cylindrical threaded bushing 120 to secure rotary encoder 110 to the PCB 100. Each of rotary encoders 110 has a number of wire leads for conveying electrical signals to and from circuits formed on PCB 100. When the discrete rotary encoders are mounted to PCB 100, these wire leads are passed through plated apertures 130 (also known as "vias"), formed through PCB 100. The wire leads are then hand soldered to the plated-through vias to complete the assembly process. Note that this procedure must be repeated fifteen times for the PCB of FIG. 1, a truly time-consuming and labor-intensive procedure.

FIG. 2 is an illustration of a rear view of a printed circuit board (PCB) 200 that corresponds to PCB 100 of FIG. 1. FIG. 2 shows a plurality of discrete rotary encoders 210 mounted thereon. The rotary encoders have leads 230 for insertion into vias 130 of FIG. 1. Discrete rotary encoders 210 are, for example, ones of the above-mentioned PEC-16 series.

The finished assembly of PCB 100, 200 of FIGS. 1 and 2 is suitable for mounting in close proximity to a front panel of an instrument. In such an arrangement, the actuation shafts of rotary encoders 110, 210 are passed through corresponding apertures in the front panel to allow operation by a user. Note that because the encoders are of the rear-mount kind, their thickness (or depth) does not interfere with close spacing of PCB 100, 200 to the panel (not shown).

Figure 3:
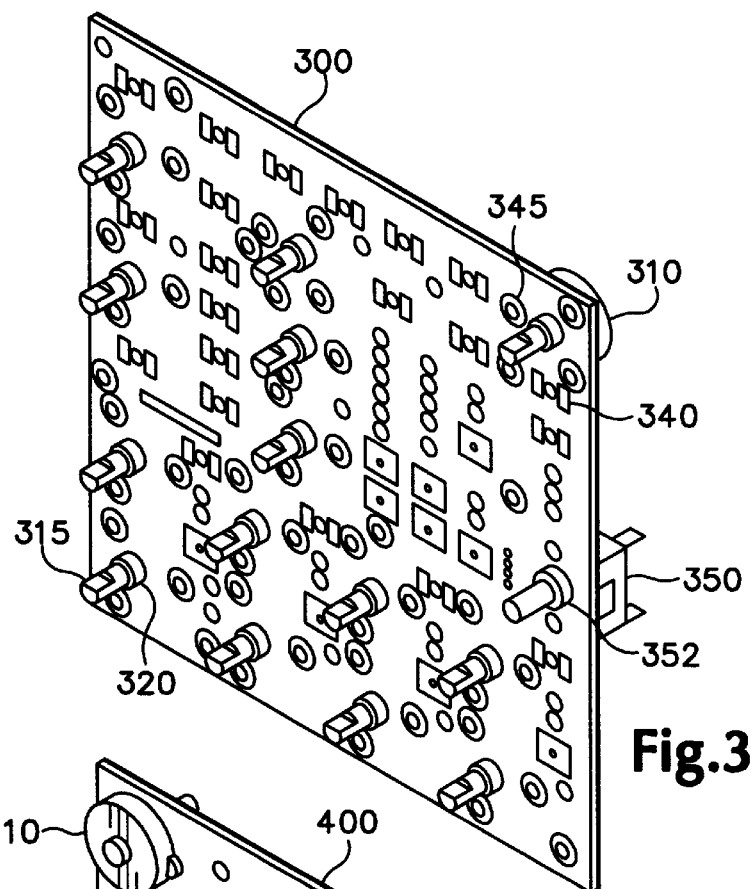
FIG. 3 shows a front view of a circuit board having mounted thereon multiple rear-mount integrated rotary encoders in accordance with the subject invention.

The subject invention will now be described with respect to FIGS. 3, 4, and 5. Referring to FIG. 3, a printed circuit board (PCB) 300 has multiple rear-mount integrated rotary encoders 310 mounted thereon. Rotary encoders 310 include an actuation shaft 315 that is disposed, and rotates, within a cylindrical bushing 320. During assembly, shaft 315 and cylindrical bushing 320 are passed through an aperture in PCB 300. Unlike the arrangement of FIG. 1, no nut is required to secure rear-mount integrated rotary encoders 310 to PCB 300. Instead, rear-mount rotary encoders 310 are secured to PCB 300 by heat staking them, a process that leads itself to automated assembly. In this process, heat is applied to heat stakes 340, bonding them to heat stake keep outs 345. Unlike the arrangement of FIG. 1, rotary encoders 310 do not require, or include, wire leads for conveying electrical signals to and from circuits formed on PCB 300. Thus, there is no need for a hand-soldering process to solder the wire leads to plated-through vias to complete the assembly process. The subject front-mounted integrated rotary encoders 310 require no leads for coupling electrical signals to circuits of PCB 300. That is, integrated rotary encoders 310 employ a surface mounted encoder module, having an open rear side with exposed electrical contacts that contact printed circuit traces formed on the front surface of PCB 300. A discrete rear-mount rotary encoder 350 is shown for comparison purposes. Note that threaded bushing 352 of the discrete rotary encoder 350 is of a larger diameter than bushing 320, requiring a larger aperture through PCB 300.

Figure 4:
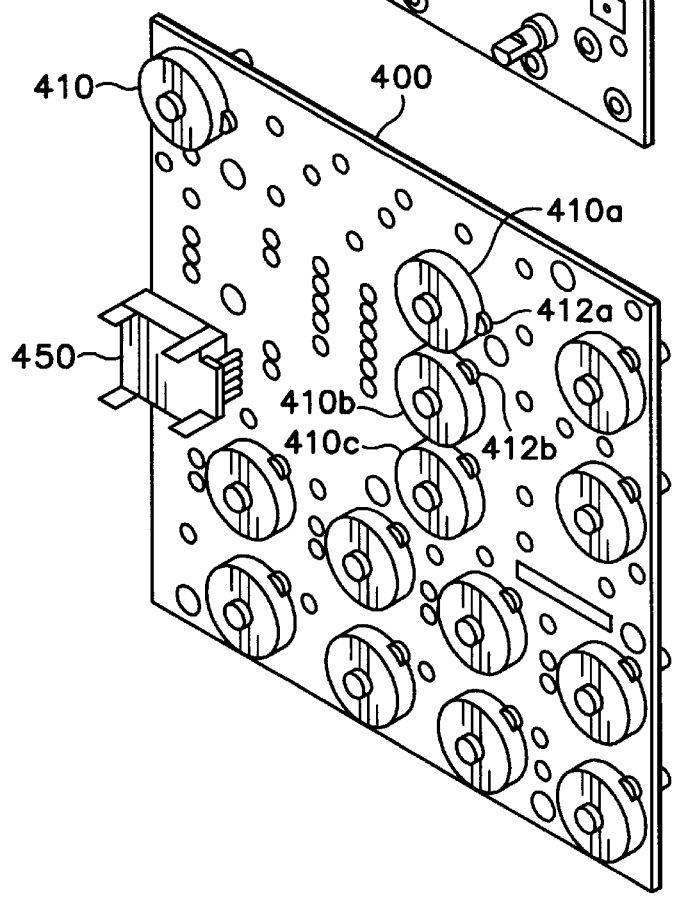
FIG. 4 shows a rear view of the circuit board of FIG. 3 having mounted thereon multiple rear-mount integrated rotary encoders in accordance with the subject invention.

FIG. 4 is an illustration of a rear view of a printed circuit board (PCB) 400 that corresponds to PCB 300 of FIG. 3. FIG. 4 shows a plurality of rear-mount integrated rotary encoders 410 mounted thereon. Rear-mount integrated rotary encoders 410 include three heat stake posts 412a (or 412b). The three-post mounting system coupled with a rear-mount integrated rotary encoder 410 having a substantially cylindrical shape allows rear-mount integrated rotary encoders 410a, 410b, 410c to be positioned in very close proximity to one another. This is accomplished by rotating each rear-mount integrated rotary encoder 410 such that heat stake posts 412a, 412b are arranged in puzzle-like fashion. While three heat stake posts are shown, more or fewer than three, may be used.

Figure 5:
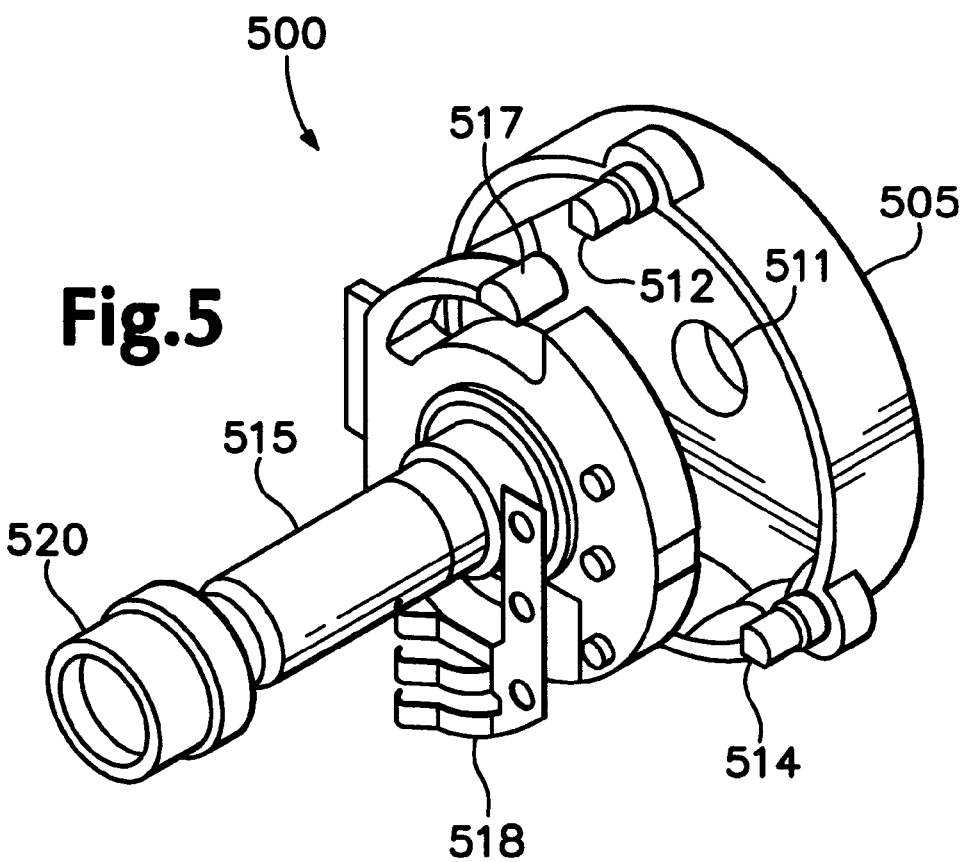
FIG. 5 shows an exploded perspective view of the mechanical assembly portion of a rear-mount integrated rotary encoder in accordance with the subject invention.

FIG. 5 is an illustration of an exploded perspective view of the mechanical portion 500 of a rear mount integrated rotary encoder in accordance with the invention. Mechanical portion 500 includes a substantially cylindrical housing 505 having a rear bushing 511, for receiving and stabilizing a shaft 515. A precision bushing 520 is pressed into PCB 300, 400 for minimizing shaft play, thereby improving feel when operated by a user. Detent action is achieved by means of a detect spring 517 that is molded onto shaft 515, and which cooperated with detent features 514 molded into housing 505. Electrical connection to a conductive pattern printed onto PCB 300, 400 is made by spring-loaded wipers (electrical contacts) 518. Three heat stake posts 512 are formed onto housing 510, and may be substantially 180 degrees apart, although for some applications non-equal spacing can be provided. Note that the front portion of the housing is substantially open to allow wipers 518 to contact the encoder pattern on PCB 300, 400.

The contact pattern of PCB 300, 400 (not shown) is a combination of a gold, nickel, and copper conducting contact surface interrupted by a dielectric material to form a pattern of conducting and non-conducting areas, known as the encoder pattern. It is noted that the encoder pattern may also be formed of a thickfilm print. Rotating shaft 515 causes contacts 518 to wipe across the encoder pattern and thereby generate an analog, or digital, output signal.

The finished assembly of PCB 300, 400 of FIGS. 3 and 4 is suitable for mounting in close proximity to a front panel of an instrument. In such an arrangement, the actuation shafts of rotary encoders 310, 410 are passed through corresponding apertures in the front panel to allow operation by a user. Note that because the integrated rotary encoders are of the rear-mount kind, their thickness (or depth) does not interfere with close spacing of PCB 300, 400 to the panel (not shown).

What has been described is a rear-mount integrated rotary encoder that provides the following advantages. First, the rear-mount integrated rotary encoders are all assembled at the same time, by the same operator, in the same process. Thus, the above-mentioned unit to unit variation in torque is greatly reduced. Second, tedious labor-intensive hand soldering operations are eliminated. Third, PCBs incorporating the rear-mount integrated rotary encoders are interchangeable (backward compatible) with existing PCBs using discrete rear-mount rotary encoders. Therefore, existing product lines can be upgraded with minimal impact. Fourth, in this approach, the integrated encoder manufacturer can provide full service to the customer by fabricating the PCB for the customer, mounting the integrated encoders, and testing the assembly for the customer.

The purposes of describing the subject invention, the terms "printed circuit board" (PCB) and "etched circuit board" (ECB) may be used interchangeably, and are deemed to be equivalent.

While heat staking has been described as a method for mounting the rear-mount integrated rotary encoder of the subject invention, other means could be employed. Such other means include press fit, cold staking (deforming the mounting stake by means of applied pressure), and snap-in stakes (momentarily deforming the stakes when inserting them into the PCB). Alternatively, one could eliminate the stakes entirely, and use a chemical adhesive on the front edge of the housing. All such modifications may be made without departing from the teaching, nor losing the benefits of, the invention. All such mounting methods are deemed to lie within the scope of the following claims.

What is claimed is:

1. A mechanical portion of rear-mount integrated rotary encoder for use with a circuit board having an encoder contact pattern formed thereon, comprising:
   a housing having a rear surface, a side surface, and a substantially open front area;
   a rotatable shaft extending substantially orthogonally through said open front area of said housing;

a rotatable circuit contacting member mechanically connected to said shaft; and a securing device for securing said mechanical portion to said circuit board;

said rotatable shaft being passed through an aperture in said circuit board such that said rotatable circuit contacting members contact said encoder contact pattern.

2. The mechanical portion of the rear-mount integrated rotary encoder of claim 1 wherein, said securing device is at least one mounting stake formed on said housing, and extending beyond said front area of said housing for engaging a mounting aperture of said circuit board.

3. The mechanical portion of the rear-mount integrated rotary encoder of claim 2 wherein, said mounting stake is a heat stake, for deforming upon application of heat after insertion into said mounting aperture of said circuit board.

4. The mechanical portion of the rear-mount integrated rotary encoder of claim 2 wherein, said mounting stake is a cold stake, for deforming upon application of pressure after insertion into said mounting aperture of said circuit board.

5. The mechanical portion of the rear-mount integrated rotary encoder of claim 2 wherein, said mounting stake is a snap-in stake, for momentarily deforming upon insertion into said mounting aperture of said circuit board.

6. The mechanical portion of the rear-mount integrated rotary encoder of claim 2 wherein, said housing is substantially cylindrical in shape and said mounting stake is mounted on an outer circumference of said housing.

7. The mechanical portion of the rear-mount integrated rotary encoder of claim 2 further including, a detent device mounted on said shaft and engaging a feature of said housing.

8. The mechanical portion of the rear-mount integrated rotary encoder of claim 1 wherein, said securing device is at least one mounting surface formed on said housing at said front area of said housing for engaging a surface of said circuit board and bonding to said circuit board by chemical adhesive means.

9. A rear-mount integrated rotary encoder, comprising:

a mechanical portion; and a circuit board portion having an aperture formed therein;

said mechanical portion including:

a housing having a rear surface, a side surface, and a substantially open front area;

a shaft extending substantially orthogonally through said open front area of said housing;

rotatable circuit contacting members mechanically connected to said shaft; and a securing device for securing said mechanical portion to said circuit board;

said circuit board portion having an area larger than a cross sectional area of said housing, and having an encoder contact pattern formed thereon;

said encoder contact pattern being concentric with respect to said aperture in said circuit board;

said rotatable shaft being passed through said aperture such that said rotatable circuit contacting members contact said encoder contact pattern on said circuit board.

10. The rear-mount integrated rotary encoder of claim 9 wherein, said securing device includes projections, mounted on said housing and substantially orthogonal to the circuit board, for engaging a feature of the circuit board for securing the integrated encoder in an assembled state.

11. The rear-mount integrated rotary encoder of claim 10 wherein, said projections are mounting stakes formed on said housing, and extending beyond said front area of said housing.

12. The rear-mount integrated rotary encoder of claim 11 wherein, said mounting stakes are heat stakes, for deforming upon application of heat after insertion into said mounting aperture of said circuit board.

13. The rear-mount integrated rotary encoder of claim 11 wherein, said mounting stakes are cold stakes, for deforming upon application of pressure after insertion into said mounting aperture of said circuit board.

14. The rear-mount integrated rotary encoder of claim 11 wherein, said mounting stakes are snap-in stakes, for momentarily deforming upon insertion into said mounting aperture of said circuit board.

15. The rear-mount integrated rotary encoder of claim 10 wherein, said housing is substantially cylindrical in shape and said projections are mounted on the outer circumference of said housing.

16. The rear-mount integrated rotary encoder of claim 9 wherein, said securing device is at least one mounting surface formed on said housing at said front area of said housing for engaging a surface of said circuit board and bonding to said circuit board by chemical adhesive means.

17. The rear-mount integrated rotary encoder of claim 9 further including, a detent device mounted on said shaft and engaging a feature of said housing.

* * * * *